US008926081B2

(12) United States Patent
Ganapathiappan et al.

(10) Patent No.: US 8,926,081 B2
(45) Date of Patent: Jan. 6, 2015

(54) INK-JET OVERCOATS INCLUDING LATEX POLYMERS AND INORGANIC NANO PARTICLES

(75) Inventors: Sivapackia Ganapathiappan, Los Altos, CA (US); Howard S. Tom, San Jose, CA (US); Hou T. Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 333 days.

(21) Appl. No.: 13/379,970

(22) PCT Filed: Jun. 30, 2009

(86) PCT No.: PCT/US2009/049305
§ 371 (c)(1),
(2), (4) Date: Dec. 21, 2011

(87) PCT Pub. No.: WO2011/002457
PCT Pub. Date: Jan. 6, 2011

(65) Prior Publication Data
US 2012/0092427 A1  Apr. 19, 2012

(51) Int. Cl.
*B41J 2/01* (2006.01)
*C09D 7/12* (2006.01)
*B41J 2/21* (2006.01)
*B41M 7/00* (2006.01)
*C09D 5/02* (2006.01)
*C08K 3/22* (2006.01)
*C08K 3/36* (2006.01)
*C08K 9/08* (2006.01)
*C08K 9/10* (2006.01)

(52) U.S. Cl.
CPC ............ *C09D 7/1225* (2013.01); *B41J 2/2107* (2013.01); *B41M 7/0027* (2013.01); *C08K 3/22* (2013.01); *C08K 3/36* (2013.01); *C08K 9/08* (2013.01); *C08K 9/10* (2013.01); *C09D 5/028* (2013.01); *C09D 7/1266* (2013.01); *C09D 7/1275* (2013.01)
USPC .............................. 347/100; 347/95; 523/160

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ................. 347/100, 95, 96, 88, 99, 101, 102; 106/31.6, 31.13, 31.27; 523/160, 161
See application file for complete search history.

(56) References Cited

U.S. PATENT DOCUMENTS

| | | | | |
|---|---|---|---|---|
| 6,005,035 | A | * | 12/1999 | Raynolds et al. ............ 524/253 |
| 6,315,405 | B1 | | 11/2001 | Chen et al. |
| 6,632,490 | B2 | | 10/2003 | Sadasivan et al. |
| 6,645,582 | B2 | | 11/2003 | Sadasivan et al. |
| 6,872,444 | B2 | | 3/2005 | McDonald et al. |
| 7,094,830 | B2 | | 8/2006 | Xue et al. |
| 2004/0063809 | A1 | * | 4/2004 | Fu et al. ......................... 523/160 |
| 2004/0157956 | A1 | | 8/2004 | Vincent et al. |
| 2004/0197531 | A1 | | 10/2004 | Vincent et al. |
| 2006/0199877 | A1 | * | 9/2006 | Ganapathiappan ........... 523/160 |
| 2007/0120923 | A1 | | 5/2007 | Kovacs et al. |
| 2007/0211126 | A1 | * | 9/2007 | Bauer et al. ................... 347/100 |
| 2011/0196084 | A1 | * | 8/2011 | Nabuurs et al. ............... 524/458 |
| 2011/0221839 | A1 | * | 9/2011 | Tabayashi ..................... 347/102 |

FOREIGN PATENT DOCUMENTS

| | | |
|---|---|---|
| CN | 1764552 | 4/2006 |
| CN | 101372603 | 2/2009 |
| EP | 1070739 | 1/2001 |
| EP | 1398333 | 3/2004 |
| EP | 2028237 | 2/2009 |

OTHER PUBLICATIONS

Extended European Search Report dated Nov. 22, 2013 for Application No./Patent No. 09846943.0-1302/2449039, PCT/US2009/049305, Applicant Hewlett-Packard Development Company, L.P.

* cited by examiner

*Primary Examiner* — Manish S Shah
(74) *Attorney, Agent, or Firm* — Thorpe, North & Western L.L.P.; Gary P. Oakeson

(57) ABSTRACT

The present disclosure is drawn to a nanoparticle containing overcoat composition for use in ink jet printing. The composition can include a liquid vehicle and a composite latex particulate. The composite latex particulate can include inorganic nanoparticles at least partially encapsulated by a polymer. The inorganic nanoparticles can be silica, titania, alumina, zinc oxide, silicates, oxides of indium and tin, and combinations thereof. The inorganic nanoparticles can comprise from about 1 wt % to about 20 wt % of the composite latex particulate. The overcoat composition can be used to improve the properties of ink-jetted images.

19 Claims, No Drawings

INK-JET OVERCOATS INCLUDING LATEX POLYMERS AND INORGANIC NANO PARTICLES

BACKGROUND

There are several reasons that ink jet printing has become a popular way of recording images on various media surfaces, particularly paper and photo media substrates. Some of these reasons include low printer noise, capability of high-speed recording, and capability of multi-color recording. Additionally, these advantages can be obtained at a relatively low price to consumers. With respect to ink jet ink chemistry, the majority of commercial ink jet inks are water-based and have low viscosities in order to accommodate the high frequency jetting and firing chamber refill processes common to thermal ink jet architecture. Latex polymers can be used in ink-jet inks because of their ability to remain dispersed in the ink while still being able to form a print film after printing.

As ink-jet ink applications have advanced, improvement of such printing systems through ongoing research and developmental efforts continue to be sought.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, "liquid vehicle," "vehicle," or "liquid medium" refers to the fluid in which the latex particulates and inorganic nanoparticles of the present disclosure can be dispersed to form the overcoat composition of the present disclosure. Liquid vehicles can also be used to carry a colorant in an ink jet ink, e.g., the printed fluid that the overcoat compositions of the present disclosure can be used to protect as an overcoat. Liquid vehicles are well known in the art, and a wide variety of such vehicles may be used in accordance with embodiments of the present disclosure. Such vehicles may include a mixture of a variety of different agents, including without limitation, surfactants, organic solvents and co-solvents, buffers, biocides, viscosity modifiers, sequestering agents, stabilizing agents, anti-kogation agents, water.

The terms "inorganic particulate" or "inorganic nanoparticles" includes non-color-imparting particulates such as aluminas, silicas, and/or other ceramics, metallics, or organo-metallics.

The term "composite latex particulate" refers to polymerized monomer latexes that have incorporated therein inorganic nanoparticulates. The nanoparticulates can be encapsulated in the polymerized latex. It is notable that individual composite latex particulates can include a plurality of inorganic nanoparticles.

As used herein "encapsulated" includes partial to complete encapsulation of a particulate. The particulate can be an inorganic nanoparticle within a polymerized monomer, e.g. a latex polymer. This encapsulation can be carried out by adsorption or by reacting the latex on the surface of the particulate.

As used herein, $T_g$ is the glass transition temperature as calculated by the Fox equation: copolymer $T_g=1/(Wa/(T_gA)+Wb/(T_gB)+...)$ where $Wa$=weight fraction of monomer A in the copolymer and $T_gA$ is the homopolymer $T_g$ value of monomer A, $Wb$=weight fraction of monomer B and $T_gB$ is the homopolymer $T_g$ value of monomer B, etc.

As used herein, "pigment" generally includes pigment colorants. It is noted, however, that when referring to inorganic particulates per se, which can be a subset of the term "pigment," these inorganic particulates include non-color-imparting particulates such as aluminas, silicas, and/or other ceramics, metallics, or organo-metallics.

Generally, the term "reactive surfactant" means any surfactant (e.g., surfmer, non-migratory surfactant, etc.) that has the ability to become affixed on the surface of a latex particle, such as, for example, by formation of a covalent bond. Typically, the reactions between reactive surfactants and the latex particle surface are sufficiently strong to prevent separation and migration therebetween.

Generally, the term "non-reactive surfactant" includes surfactants that are adsorbed (as opposed to fixed, reacted, or bonded) onto the surface of the latex particle.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Generally, the durability of ink jet ink prints is poor compared to laser and LEP prints. Specifically, the highlighter fastness, rub resistances, wet smudge fastness, light fastness, ozone fastness, and optical density after highlighter smear tend to be of lesser quality compared to the other printing methods. Latex polymers can be used to aid in improving the durability of ink-jetted images; however, the inclusion of latex polymers can contribute to a reduction in the quality of the printed image due to interactions of the polymers with pigments. At the same time, chemical additives that improve waterfastness can be added to the latex polymer containing inks, but these inks still do not have desired rub resistance qualities. Accordingly, there is interest in developing systems that can provide high quality images that have the desired durability characteristics.

In accordance with this, the present disclosure is drawn to nanoparticle containing overcoat compositions, systems, and associated methods. It is noted that when discussing the present compositions, systems, or associated methods, each of these discussions can be considered applicable to each of these embodiments, whether or not they are explicitly discussed in the context of that embodiment. Thus, for example, in discussing a monomer present in an overcoat composition, such a monomer can also be used in the systems and methods.

With the above definitions and background in mind, a colorless nanoparticle containing overcoat composition for use in ink-jet printing is disclosed herein. The overcoat composition can include a liquid vehicle and a composite latex particulate. The composite latex particulate can include inorganic nanoparticles at least partially encapsulated by a polymer. The polymer is typically a copolymer of a plurality of polymerized monomers. In one embodiment, the polymer can fully encapsulated at least one inorganic nanoparticle. The inorganic nanoparticles can be selected from the group consisting of silica, titania, alumina, zinc oxide, silicates, oxides of indium and tin, and combinations thereof.

A system for printing durable images is also provided. The system includes a colored ink composition which includes a colored pigment, and the overcoat composition described herein. Additionally, a method of increasing the durability of an ink jetted image can comprise ink jetting an image on a substrate using a colored ink composition and then overcoating the image with the overcoat composition of the present disclosure.

The overcoat compositions of the present disclosure provide meaningful improvement to the durability of ink-jet inks and ink-jetted images. Specifically, the overcoat composition improves the highlighter smearfastness, light fastness, ozone fastness, rub resistance, wet smudgefastness and optical density (after highlighting smear) compared to an ink that includes more traditional latex-based overcoatings, i.e. latex particles include otherwise identical monomers except that the latex does not encapsulate inorganic particulates. The overcoat compositions form a non-wetting layer when applied to ink-jetted images thereby sealing the ink from outside detrimental elements such as ozone, light, and highlighter fluid. The inorganic nanoparticles incorporated into the composite latex particulate of the overcoat composition act to improve the strength of the film and form a tough film which has increased tensile strength thereby enhancing the durability of the overcoated images. Additionally, the overcoat compositions allow for a broader array of inks to be used due to the ability of the overcoat compositions to provide increased durability. Further, the present disclosure provides a means of increasing the durability of printed images without increasing the overall cost of the image production significantly.

The monomers used in the formation of the polymer of composite latex particulates described herein can be any of a number of compounds capable of forming a polymer. In one embodiment, the monomer(s) can be hydrophobic monomer, acidic, or combinations thereof. In one embodiment, the hydrophobic monomer can comprise 0.1 wt % to 98 wt % of the polymerized monomer. In another embodiment, the hydrophobic monomer can comprise 10 wt % to 80 wt % of the polymerized monomer. Suitable hydrophobic monomers generally include monomers known in the latex arts for synthesizing latexes that generally are not solvated by water. Hydrophobic monomers include, without limitation, styrene, p-methyl styrene, methyl methacrylate, hexyl acrylate, hexyl methacrylate, 2-ethylhexyl acrylate, 2-ethylhexyl methacrylate, butyl acrylate, butyl methacrylate, ethyl acrylate, ethyl methacrylate, propyl acrylate, propyl methacrylate, octadecyl acrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, derivatives thereof, and mixtures thereof.

When present, the acid monomer can comprise from 0.1 wt % to 20 wt % of the polymerized monomer. Non-limiting examples of acid monomers can include acrylic acid, methacrylic acid, ethacrylic acid, dimethylacrylic acid, maleic anhydride, vinylsulfonate, cyano acrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-l-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, derivatives thereof, and mixtures thereof.

The polymerized monomers of the composite latex particulates described herein can also include a crosslinker that crosslinks the polymerized monomers and enhances the durability of the composite latex particulate. Suitable cross-linking monomers include polyfunctional monomers and oligomers that contain an organic functional group available for cross-linking after polymerization. Such cross-linking monomers include, without limitation, ethylene glycol dimethacrylate, diethylene glycol dimethacrylate, ethylene glycol diacrylate, diethylene glycol diacrylate, 1,6-hexanediol diacrylate, tetraethylene glycol diacrylate, tripropylene glycol diacrylate, ethoxylated bisphenol A diacrylate, pentaerythritol tri- and tetraacrylate, N,N'-methylenebisacrylamide, divinylbenzene and combinations thereof, mixtures thereof, and derivatives thereof When present, the cross-linkers can comprise from 0.1 wt % to 15 wt % of the polymerized monomers.

The inorganic nanoparticles included in the composite latex particulates are non-color imparting and can be formed from various inorganic materials including, but not limited to silica, titania, alumina, zinc oxide, silicates, oxides of indium and tin, and combinations thereof. In one embodiment, the inorganic nanoparticles can be from 1 nm to 200 nm in size. In another embodiment, the inorganic nanoparticles can be from 2 nm to 100 nm in size. In another embodiment, the inorganic nanoparticles can be from 5 nm to 20 nm in size. Generally, inclusion of less than 1 wt % nanoparticles does not meaningfully improve durability of the coated image while, amounts greater than about 70 wt % does not significantly improve the durability. In one embodiment, the inorganic nanoparticles can comprise from 1 wt % to 20 wt % of the composite latex particulate. In another embodiment, the inorganic nanoparticles can comprise from 5 wt % to 20 wt % of the composite latex particulate. In still other embodiments, the inorganic nanoparticles can comprise from 8 wt % to 17 wt %, or alternatively, from 10 wt % to 15 wt % of the composite latex particulate. It is noted that when referring to a "composite latex particulate," typically there are plurality of these composite latex particulates in a common dispersion, and thus, these weight percentages are considered to be distributed across the entire dispersion.

The composite latex particulates of the present disclosure can be prepared by any compositing or polymerizing method, such as conventional emulsion polymerization, semi-batch emulsion polymerization, or mini-emulsion. For example, in one embodiment, the composite latex particulates can be prepared by mixing monomers together to form a monomer mixture. Surfactant(s) and inorganic nanoparticles can then be added to the monomer mixture and sheared to form an emulsion. The surfactant(s) may include a reactive surfactant, a non-reactive surfactant, or a combination of reactive and non-reactive surfactants. In one embodiment of the disclosure, non-reactive surfactants can be used in polymerizing the latex particle, and reactive surfactants can be used, either in concert or added in a second step to form a surfactant coating at or near the surface. Alternatively, polymerization can be carried out as a soap-free polymerization, with a reactive surfactant being added near the end of polymerization.

In further detail with respect to reactive surfactants, in one embodiment, it is noted that a reactive surfactant can be added during the polymerization process. Generally, the reactive surfactant contains hydrophobic moieties that can be covalently bound to the surface of the polymeric particles. Additionally, such a reactive surfactant can be incorporated during the polymerization via appropriate organic groups, e.g., a vinyl group, such that the surface of the polymeric particles contains the reactive surfactant. Generally, the reactive surfactant can contain hydrophilic groups that allow the polymeric particles to be dispersed and/or stabilized in an aqueous medium. The hydrophilic groups can be anionic, cationic, nonionic, or zwitterionic. For example, suitable anionic groups include sulfonate, phosphonate, and carboxylate groups; suitable cationic groups include amine groups; and suitable nonionic groups include polyethelyene oxide, imidazole and amido groups. As such, in one embodiment, the reactive surfactants can be functionalized ethylene glycol acrylates, including the SIPOMER® series of surfactants from Rhodia.

It is noted that even though the process steps with respect to the addition of surfactant (as well as any other steps) have been described in a certain order, such steps are not limited to such an order, nor are the embodiments described herein meant to be limited to any such order, unless specifically stated. In any of these polymerization methods, the inorganic nanoparticles can be added during the polymerization process to form at least partially encapsulated nanoparticles.

It is noteworthy that the polymerization of the inorganic nanoparticles into the composite latex particulate can reduce or eliminate the need for additional surfactants in the overcoat composition. In other words, when using inorganic nanoparticles alone in a coating composition (not encapsulated by polymer), these nanoparticles have an increased concentration of surfactant in order to inhibit the settling of the inorganic nanoparticles. In addition, the composite latex particulates, having surface charge, can be stably suspended by themselves without any additives. This can avoid loading excess surfactants into the ink.

Thus, with the compositions of the present disclosure, less surfactant can be used in the overcoat composition as a whole.

The particle size of the composite latex particulate (as a whole, including the inorganic nanoparticle and the latex polymer coating) is typically greater than 100 nm. The selected composite latex particulate can be sized below 400 nm, more typically less than 350 nm. In one embodiment, the composite latex particulate can have a diameter from about 50 to 350 nm, though diameters outside of this range may be appropriate as well for certain applications. In another embodiment, the range can be from about 150 nm to about 350 nm. In another embodiment, the range can be from 150 nm to 250 nm. The composite latex particulates can be stabilized through the incorporation of a hydrophilic monomer that promotes surface charge, including those previously discussed. The charge forming monomers can be neutralized after polymerization to form salts. For example, such salts may be formed through the reaction of a monomer carboxylic acid with potassium hydroxide or other similar base.

The polymer of the composite latex particulates of the present disclosure can have glass transition temperatures of about $0° C. \leq T_g \leq 125° C$. In an alternative embodiment, the glass transition temperature range can be from $25° C. \leq T_g \leq 75° C$. These temperature ranges can allow for room temperature film formation of an overcoat layer without process or pen induced particle agglomeration. Higher glass transition temperature ranges may be selected for use when coagulation of the composite latex particulate is accomplished at a higher than ambient temperature, for example by heated fuser rollers or other heating sources. When using a conjugated ring structure, the π-electrons of such ring structures can provide strong adhesive forces without the added density typical of more polar monomers. Additionally, a blend of alkane and ring-based monomers can be used to adjust the thermal glass transition temperature ($T_g$) of the composite latex particulate for overcoat formation.

With these parameters in place regarding the composite latex particulates, a discussion of dispersion fluids, e.g., inks, etc., is useful to exemplify how these particulates can be implemented for use in accordance with an embodiment of the present disclosure and incorporated into the overcoat composition. Generally, the composite latex particulates can comprise from about 0.5 wt % to about 40 wt % of the overcoat composition. In one embodiment, the composite latex particulates can comprise from about 1 wt % to about 15 wt % of the overcoat composition. In yet another embodiment, the composite latex particulates can comprise from about 3 wt % to about 6 wt % of the overcoat composition. Typical liquid vehicle formulation that can be used with the composite latex particulates to form the overcoat composition can include water, and optionally, one or more co-solvents present in total at from 0.1 wt % to 50 wt %, depending on the jetting architecture. Further, one or more non-ionic, cationic, and/or anionic surfactant can optionally be present, ranging from 0.01 wt % to 10.0 wt %. The balance of the formulation can be purified water, or other vehicle components known in the art, such as biocides, viscosity modifiers, materials for pH adjustment, sequestering agents, preservatives, and the like. In one embodiment, the liquid vehicle can be predominantly water.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

Separate from the surfactant used in forming the composite latex particulates, one or more of many surfactants can also be used to formulate the coating composition as are known by those skilled in the ink jet arts including, but not limited to, alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the overcoat composition, if used, can be from 0.1 wt % to 10.0 wt %. Sometimes, surfactants do not need to be added in formulating the overcoat composition because adequate surfactant is present in the dispersion upon preparation of the composite latex particulates. In one embodiment, the total surfactants can be present in the final overcoat composition at a surfactant to composition latex particulate weight ratio of about 1:200 (W/W) to about 1:20 (W/W). In another embodiment, the surfactants can be present at a surfactant to composite latex particulate weight ratio of about 1:50 (W/W) to about 1:30 (W/W). Again, it is to be noted that the surfactant that is described as being usable in the liquid vehicle of the overcoat composition is not the same as the surfactant that is described as being adhered to the surface or present during the formation of the composite latex particulates, though many of the same surfactants can be used for either purpose. In some embodiments, the same surfactant can be used for both particulate formation and for ink composition formulation.

Consistent with the overcoat compositions of this disclosure, various other additives may be employed to optimize the properties of the overcoat composition for specific applications or for use with particular inks or substrates. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

The overcoat compositions can be used with any type of ink jetted ink. In one embodiment, a system for printing durable images is provided including a colored ink composition (including a colored pigment or dye) and the overcoat composition of the present disclosure. In another embodiment, a method of increasing the durability of an ink-jetted image can comprise ink jetting an image on a substrate using a colored ink composition (including a colored pigment or dye), and overcoating the image with the overcoat composition described herein. In either embodiment, if a pigment is used, such a pigment can include, without limitation, black including carbon black, magenta, yellow, blue, cyan, pink, orange, green, blue, etc. Additionally, the pigments may be used with a separate dispersant, e.g., surfactant or polymer dispersant, and/or can be self-dispersed, e.g., small molecule- or polymer-modified pigment surface. In another embodiment, the pigment can be an encapsulated pigment. In one embodiment, the system can be configured such that the overcoat composition and the colored ink are ink jetted from the same pen. In another embodiment, the overcoat composition can be printed in the same pass as the colored ink composition.

EXAMPLES

The following examples illustrate embodiments of the disclosure that are presently known. Thus, these examples should not be considered as limitations of the disclosure, but are merely in place to teach how to make compositions of the present disclosure. As such, a representative number of compositions and their method of manufacture are disclosed herein.

Example 1

Preparation of Polymer Encapsulated Silica Nanoparticles

Hydrophobic silica nanoparticles (6.5 g) are mixed with water (137 ml) containing the 30 wt % of the surfactant Rhodafac RS 710. The mixture is vigorously shaken and sonicated for 30 minutes resulting in 4.43 wt % silica nanoparticles in the water. About 45 g of this dispersion is then taken in a 500 ml flask and water (20 ml) is added thereto. The mixture is stirred well and heated to 90° C. In a separate container, an emulsion of styrene (16.2 g), butyl acrylate (2.6 g) and methacrylic acid (1.25 g), along with isooctylthiglycolate (1.6 g) is prepared in water (136 ml) containing 30 wt % Rhodadac RS 710 (33.28 g). Potassium persulfate (0.07 g) is added to the heated water dispersion after which the emulsion monomer mixture over is added over a period of about 20 minutes. The reaction mixture is maintained at 90° C. for another 2 hours and then cooled to ambient temperature. Afterward, the reaction mixture is neutralized with 50% KOH solution to a pH of 8.5 to obtain composite latex particulates including hydrophobic silica nanoparticles.

Example 2

Syntheses of Latex Polymer (Control)

The monomers styrene (324 g), butyl acrylate (52 g) and methacrylic acid (24 g), along with chain transfer agent isooctylmercaptopropioate (1.6 g), are emulsified in water (136 ml) containing Rhodafac RS 710 (33.28 g). An initiator solution is prepared by dissolving potassium persulfate (1.39 g) in water (160 ml). Water (1160 ml) is heated to 90° C. Then, 32 ml of the initiator solution is added to hot water followed by the simultaneous addition of the remaining initiator solution and the monomer emulsion. The emulsion addition takes 33 minutes while the initiator addition takes 35 minutes. The reaction mixture is maintained at a temperature of about 90° C. for a period of about 2.5 hours and then cooled. The pH of the formed latex is then adjusted to 8.5 with 50% potassium hydroxide solution. The end product is then filtered to obtain a latex having a 21.8% solid content.

Example 3

Overcoat Formulations

A latex encapsulated nanoparticle (nanoparticle size in the range of 5-20 nm) is prepared as described in Example 1. An ink-jettable coating composition is prepared by dispersing 1-15 wt % solids of the nanoparticle incorporated latexes in a liquid vehicle. The liquid vehicle includes 5-20 wt % organic solvent, 0.1-20 wt % surfactant, 0.5 wt % biocide, and the balance being water. The overcoat composition prepared is colorless.

Example 4

Comparison Testing of Overcoats with Composite Latex Particulates Compared to Overcoats with Standard Latex Particulates A representative number of compositions prepared within the ranges set forth in Example 3 are applied over an ink-jet produced image using a Hewlett-Packard printer. Comparative overcoat compositions also prepared with the same formulation for each comparison, only rather than the composite latex particulate of Example 1, a standard latex particulate of Example 2 is used. The smearfastness and rub resistance of each overcoat is tested using a dry rub test and window cleaner test.

The dry rub test is performed with a linear abraser (specifically a TABER® Linear Abraser-Model 5750). The arm of the linear abraser strokes each media sample in a linear motion back and forth at a controlled stroke speed and length, the head of the linear abraser following the contours of the media samples. To the shaft of the arm of the linear abraser, a 250 gram weight is added to make the load constant. Specifically for the rub test, a stroking head or "weraser" is attached to the end of the arm of the linear abraser. The stroking head is the size and shape of a pencil eraser and has a contact patch with a diameter of approximately ¼ inch diameter. The stroking head is abrasive (specifically CALIBRASE® CS-10) with a mild to medium abrasive effect. The stroking head is stroked back and forth 10 times on each media sample. The rubbed media samples are judged for color fastness.

The window cleaner test is performed with a linear abraser (specifically a Taber® Linear Abraser-Model 5750). The arm of the linear abraser strokes each media sample in a linear motion back and forth at a controlled stroke speed and length, the head of the linear abraser following the contours of the media samples. To the shaft of the arm of the linear abraser, a 250 gram weight is added to make the load constant. Specifically for the window cleaner test, an acrylic finger (specifically from a Taber® Crock Meter Kit) covered by a cloth (specifically a TABER® Crocking Cloth) is attached to the end of the arm of the linear abraser. WINDEX® window cleaner is applied to the cloth, and the cloth-covered end of the acrylic finger is stroked back and forth 5 times on each media sample. The rubbed media samples are judged for color fastness.

In each test, the overcoat composition of Example 3 provides improved smearfastness and improved rub resistance when compared to its respective comparative overcoat composition (using standard latex particulates rather than composite latex particulates).

While the disclosure has been described with reference to certain exemplified embodiments, those skilled in the art will appreciate that various modifications, changes, omissions, and substitutions can be made without departing from the spirit of the disclosure. It is intended, therefore, that the invention be limited only by the scope of the following claims.

What is claimed is:

1. An inorganic nanoparticle containing overcoat composition for use in ink jet printing, comprising:
    a liquid vehicle,
    a composite latex particulate, said composite latex particulate comprising inorganic nanoparticles at least partially encapsulated by a polymer, wherein the polymer comprises polymerized monomers including a hydrophobic monomer and an acid containing monomer, the acid containing monomer being present at from 0.1 wt % to 20 wt % of the polymerized monomers, said inorganic particulates selected from the group consisting of silica, titania, alumina, zinc oxide, silicates, oxides of indium and tin, and combinations thereof,
    wherein the inorganic nanoparticle comprises 1 wt % to 70 wt % of the composite latex particulate, and wherein the overcoat composition when printed is transparent or translucent.

2. The overcoat composition of claim 1, wherein the inorganic nanoparticle comprises 5 wt % to 20 wt % of the composite latex particulate.

3. The overcoat composition of claim 1, wherein the inorganic nanoparticle comprises 10 wt % to 15 wt % of the composite latex particulate.

4. The overcoat composition of claim 1, further comprising a surfactant, said surfactant being present at a weight ratio of about 1:200 to about 1:20 with respect to the composite latex particulate.

5. The overcoat composition of claim 1, further comprising a surfactant, said surfactant being present at a weight ratio of about 1:50 to about 1:30 with respect to the composite latex particulate.

6. The overcoat composition of claim 1, wherein the polymer has a Tg of 0° C. to 125° C.

7. The overcoat composition of claim 1, wherein the polymer has a Tg of 25° C. to 75° C.

8. The overcoat composition of claim 1, wherein the inorganic nanoparticles have a size from 1 nm to 200 nm.

9. The overcoat composition of claim 1, wherein the composite latex particulate has a size from 100 nm to 400 nm.

10. The overcoat composition of claim 1, wherein the composite latex particulate comprises from 0.5 wt % to about 40 wt % of the overcoat composition.

11. The overcoat composition of claim 1, wherein at least one inorganic nanoparticle is fully encapsulated by the polymer.

12. A system for printing durable images, comprising:
    a colored ink composition, and
    an overcoat composition as in claim 1.

13. The system of claim 12, wherein the colored ink includes a colored pigment.

14. A method of increasing the durability of an ink jetted image, comprising:
    ink jetting an image on a substrate using a colored ink composition; and
    overcoating the image with the overcoat composition of claim 1.

15. An organic nanoparticle containing overcoat composition for use in ink-jet printing, comprising:
    a liquid vehicle,
    a composite latex particulate, said composite latex particulate comprising inorganic nanoparticles at least partially encapsulated by a polymer, said organic particulates selected from the group consisting of silica, titania, alumina, zinc oxide, silicates, oxides of indium and tin, and combinations thereof, wherein the inorganic nanoparticle comprises 1 wt % to 70 wt % of the composite latex particulate, wherein the composite latex particulate has a size from 100 nm to 400 nm and wherein the overcoat composition when printed is transparent or translucent.

16. The overcoat composition of claim 15, wherein the inorganic nanoparticles comprises 5 wt % to 20 wt % of the composite latex particulate.

17. The overcoat composition of claim 15, wherein the inorganic nanoparticles comprises 10 wt % to 15 wt % of the composite latex particulate.

18. The overcoat composition of claim 15, further comprising a surfactant, said surfactant bneing present at a weight ratio of about 1:200 to about 1:20 with respect to the composite latex particulate.

19. The overcoat composition of claim 15, wherein the polymer has a Tg of 0 °C. to 125 °C.

* * * * *

UNITED STATES PATENT AND TRADEMARK OFFICE
CERTIFICATE OF CORRECTION

PATENT NO. : 8,926,081 B2  
APPLICATION NO. : 13/379970  
DATED : January 6, 2015  
INVENTOR(S) : Sivapackia Ganapathiappan et al.

It is certified that error appears in the above-identified patent and that said Letters Patent is hereby corrected as shown below:

In the Claims

In column 10, line 62, in Claim 15, delete "organic" and insert -- inorganic --, therefor.

In column 10, line 63, in Claim 15, delete "printing,comprising" and insert -- printing, comprising --, therefor.

In column 10, line 67, in Claim 15, delete "organic" and insert -- inorganic --, therefor.

In column 11, line 7, in Claim 15, delete "nm" and insert -- nm, --, therefor.

In column 11, line 10, in Claim 16, delete "nanoparticles" and insert -- nanoparticle --, therefor.

In column 11, line 12, in Claim 17, delete "15,wherein" and insert -- 15, wherein --, therefor.

In column 11, line 13, in Claim 17, delete "nanoparticles" and insert -- nanoparticle --, therefor.

In column 11, line 16, in Claim 18, delete "bneing" and insert -- being --, therefor.

In column 11, line 20, in Claim 19, delete "0 °C. to 125 °C." and insert -- 0° C. to 125° C. --, therefor.

Signed and Sealed this  
Sixteenth Day of June, 2015

Michelle K. Lee  
*Director of the United States Patent and Trademark Office*